Oct. 11, 1966 — W. B. STONE, JR — 3,277,978
AUTOMOBILE ELEVATING DEVICE FOR INCREASING THE CAPACITY OF PARKING LOTS
Filed June 15, 1965 — 2 Sheets-Sheet 1
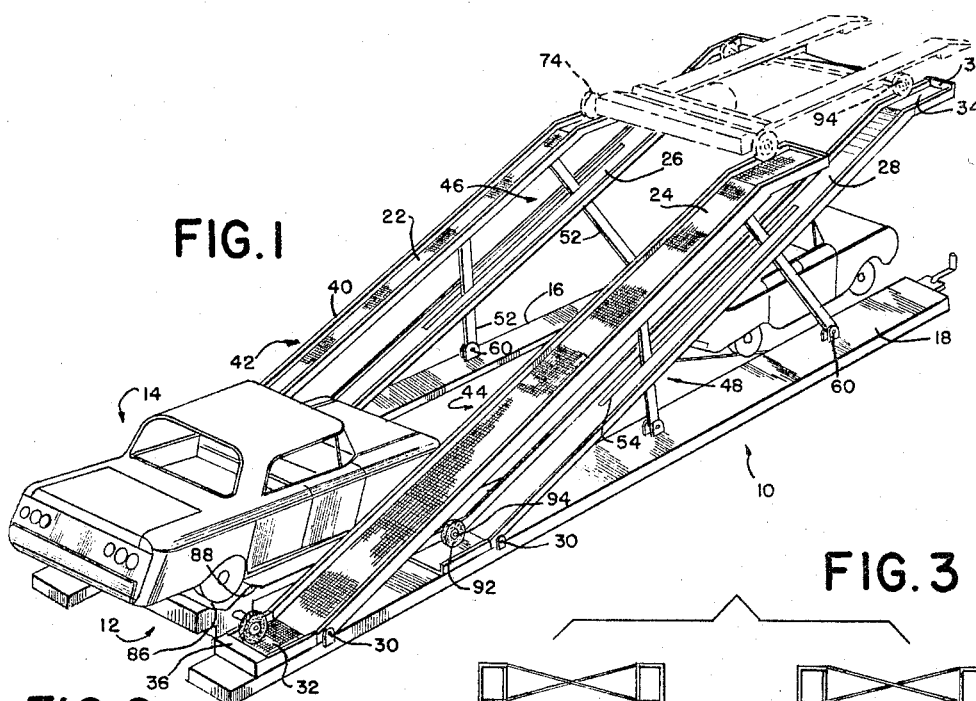
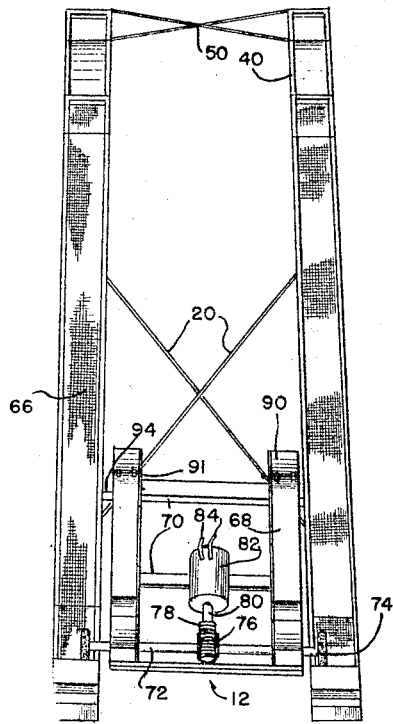
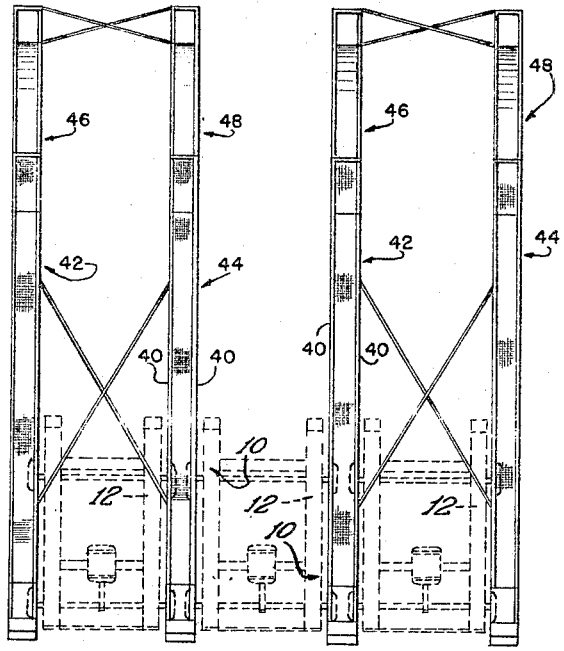
INVENTOR
WAYNE B. STONE, Jr.
BY *Wayne B. Stone Jr.*
ATTORNEY

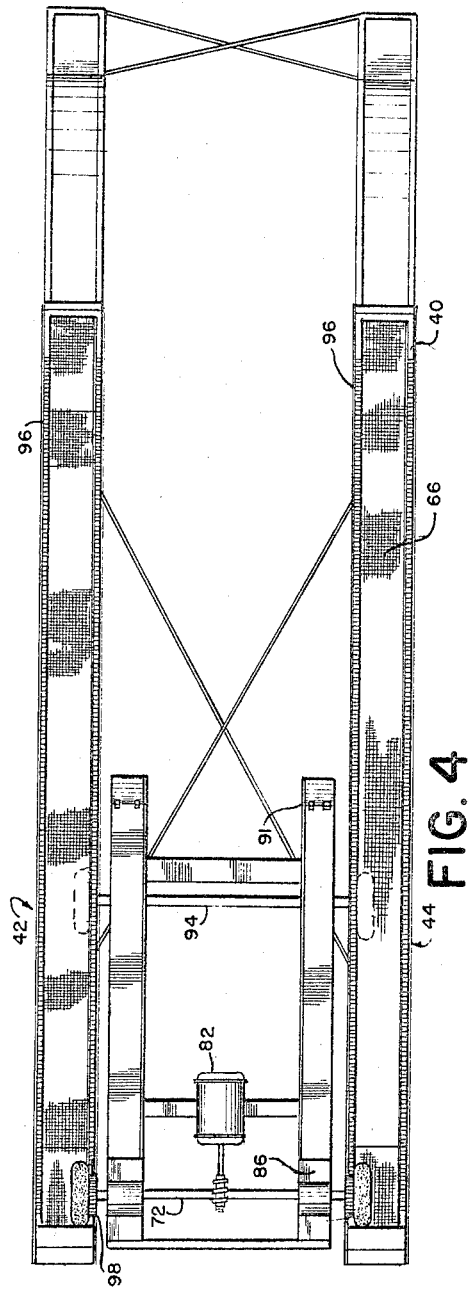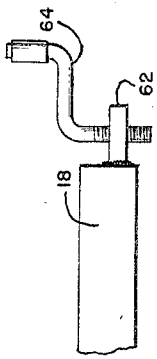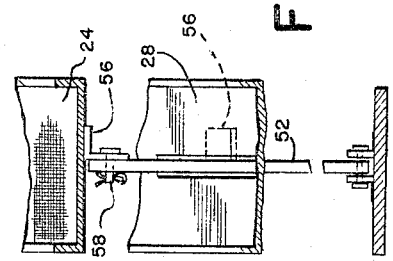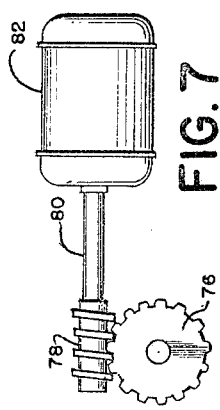
Oct. 11, 1966 W. B. STONE, JR 3,277,978
AUTOMOBILE ELEVATING DEVICE FOR INCREASING
THE CAPACITY OF PARKING LOTS
Filed June 15, 1965 2 Sheets-Sheet 2
INVENTOR
WAYNE B. STONE, JR.
BY
ATTORNEY

United States Patent Office 3,277,978
Patented Oct. 11, 1966

3,277,978
AUTOMOBILE ELEVATING DEVICE FOR IN-
CREASING THE CAPACITY OF PARKING
LOTS
Wayne B. Stone, Jr., 5115 Flanders Ave.,
Kensington, Md.
Filed June 15, 1965, Ser. No. 464,057
4 Claims. (Cl. 187—12)

This invention relates to a load elevating device and, in particular, to a means for elevating an automobile whereby the parking capacity of a parking lot may be increased.

There are many areas of business, such as parking lots, service stations and automobile agencies, in which it is necessary to park or store automobiles for various periods of time and in which the space available for this purpose is limited.

Prior attempts to increase the parking capacity of a given area have, in general, involved the use of parking buildings which require a large capital outlay and may not be feasible for small businesses.

Other efforts have been made to produce single unit elevators to support an automobile approximately six feet off the ground whereby a second automobile may be parked directly beneath the elevated automobile. These latter prior devices have involved hydraulic lifts which are unduly expensive and require permanent installation or unsightly cable lift type units which are not dependable in operation.

It is the object of this invention to provide a single unit elevating device, primarily for automobiles, which utilizes a novel arrangement of simple inclined planes, wheels and a reversible motor to elevate an automobile.

Another feature of the invention is that the primary supporting structure may be readily fabricated from standard structural shapes with releasable pin connections whereby it may be collapsed for ready transport. The construction of the load elevating device being such that a permanent installation is not required.

The elevating device of this invention is further provided with means whereby it may be manually leveled to accommodate the contour of an uneven lot.

Auxiliary means are provided to insure proper functioning of the elevating device under adverse weather conditions, such as snow or ice.

In the drawings:

FIGURE 1 is a perspective view of the load elevating device showing, in solid lines, a car positioned on an elevating platform and, in phantom outline, the elevated position of the platform omitting a phantom showing of the car for purposes of clarity in illustration;

FIGURE 2 is a top perspective view of the device showing the platform in the lowered position;

FIGURE 3 is a somewhat diagrammatic showing of the manner in which two of the support structures may be positioned to support three elevating platforms;

FIGURE 4 is a perspective view, somewhat similar to that of FIGURE 2, showing a slightly modified form of the invention;

FIGURE 5 is a fragmentary showing of a portion of the support structure;

FIGURE 6 is a broken fragmentary illustration of the releasable connection between portions of the support structure; and FIGURE 7 illustrates the driving and brake means for the elevating platform.

The load elevating device of this invention includes a support structure 10 supporting a wheeled platform 12 for elevating a load such as an automobile 14 or the like.

The support structure 10 includes generally horizontal ground engaging base members 16, 18 suitably cross braced at 20 and provided with upwardly and forwardly inclined plane portions 22, 24, 26, 28 pivoted to the base members at 30 and arranged in forward and rearward pairs.

The expression "forward," as used herein, refers to the direction in which the platform 12 moves when traveling from the lower position, shown in full lines in FIGURE 1, to the upper position indicated in phantom lines.

The inclined planes 22, 24, 26, 28 merge smoothly with lower and upper generally horizontal surfaces 32 and 34 having abutments 36 and 38 at their respective outer extremities. The upper surfaces 34 may be formed integral with their respective inclined planes while the lower surfaces 32 are fixed to their respective base members 16, 18 or are integral therewith.

The inclined planes 22, 24, 26, 28 and their conjoint horizontal surfaces 32, 34, provided with upstanding guide flanges 40 along their lateral edges, define forward and rearward pairs of track like supporting means 42, 44, 46, 48 for the traverse of elevating platform 12 from lower surfaces 32 to upper horizontal surfaces 34. The rearward or upper pair of track means 42, 44 and the forward or underlying pair of track means 46, 48 are transversely aligned and transversely spaced a distance wider than automobile 14 whereby additional cars may be parked on the ground between base members 16 and 18 and the forward and rearward pairs of track means as shown in FIGURE 1.

Cross bracing 50 may be provided between the forward horizontal support surfaces if desired and secured thereto by removable pin connections (not shown). Although not illustrated, an additional cross brace in the form of an inverted U-shaped bail member may be provided across the rear inclined plane portions, interconnecting their centerlines, to provide further rigidity to the structure.

Generally upright side braces 52 extend through elongated slots 54 formed in the midline of the forward inclined plane portions 26, 28 and are secured to the undersurfaces of the forward inclined portions 26, 28 on either side of slots 54 by right angle brackets 56, best shown in FIGURE 6, which may be fixedly secured to the forward inclined portions but which are releasably connected to side braces 52 by pins 58 or the like. The upper ends of the side braces are similarly releasably connected to the undersurfaces of the rearward inclined plane portions 22, 24 by brackets and pins. It will be noted that the forward side braces 52 are connected at right angles to the inclined plane portions 22, 24, 26, 28. Side braces 52 are pivotally connected to base members 16 and 18 by pivots 60. Slots 54 extending along the centerline of the forward inclined plane portions are sufficiently long to permit side braces 52 to pivot downwardly about their pivots 60 and the inclined plane portions to pivot downwardly, relative to surfaces 32, about the base pivots 30 when the releasable connections 58 between the side braces and brackets are removed. In this manner the load supporting structure may be collapsed to facilitate its transport from place to place.

Heavy duty nuts 62 may be welded to the four corners of the base structure, such as shown at the right forward corner in FIGURE 1, whereby a screw jack 64 having a universally mounted head (not shown) may be used to elevate one or more corners of the structure to compensate for an uneven lot.

The rear pair of track means 42, 44 are preferably provided with a roughened friction increasing surface, herein illustrated as an open mesh 66, which may be formed integrally with the track means or formed separately and secured thereto.

The wheeled elevating platform 12 includes load supporting ramp portions 68 spaced apart a distance approximating the width of automobile 14 by suitable bracing 70. Ramp portions 68, which may be formed with guide flanges along their inner edges if desired, are of such width and so spaced as to accommodate cars having varying wheel widths.

A transverse axle shaft 72 having end portions extending laterally beyond each side of ramp portions 68 is rotatably supported adjacent the rear end of platform 12. A pair of wheels 74 are nonrotatably secured to the outer ends of shaft 72 beyond the lateral confines of the load supporting portion of platform 12. A gear 72 is nonrotatably secured to shaft 72 within the lateral confines of the load supporting portion of platform 12 in meshing engagement with a worm gear 78 affixed to output shaft 80 of a reversible motor 82 supported on bracing structure 70.

The motor 82, which may be either hydraulic or electric, is provided with power leads 84 for communication with a suitable source of power such as a fluid pump, an electric power line or a battery.

Ramp portions 68 terminate at their rearward ends, adjacent shaft 72, in shallow depressions 86 which merge with ramps 68 through sloping surfaces 88. The forward ends of ramps 68 are provided with flap-like extensions 90 pivoted thereto at 91 which engage the ground when platform 12 is positioned on support structure 10 in the lower position shown in FIGURE 2.

Wheels 92 are rotatably supported outside the lateral confines of platform 12 at the forward end thereof by an axle shaft 94 mounted on the platform.

As will be apparent from an inspection of FIGURE 1, platform 12 is positioned on support structure 10 with the front and rear wheels 92, 74 engaging the front and rear pairs of track like supporting means 42, 44 and 46, 48. With wheels 74, 92 of platform 12 resting on lower horizontal surfaces 32, the rear wheels 74 in engagement with abutments 36 and the downwardly extending portions 90 of ramps 68 resting on the ground, a car 14 may be backed onto the platform along ramps 68 until its rear wheels come to rest in the depressions 86. Thereafter, motor 82 is energized to drive platform wheels 74 through the irreversible gearing shown in FIGURES 2 and 7.

When elevating platform 12 reaches the upper position shown in phantom lines in FIGURE 1, motor 82 is deenergized and gears 76, 78 between motor 82 and shaft 72 act as a brake for the platform.

With platform 12 supporting a car in the raised position, as indicated by the phantom position of the platform in FIGURE 1, a second car may be driven between base members 16 and 18 and between the inclined portions pivoted thereto to occupy the position previously occupied by the platform and car 14 in the lower position. A third car, shown in solid lines in FIGURE 1, may then be parked directly beneath the elevated car.

The overall length of the support structure is approximately two car lengths long though its length, as well as its height, has been greatly exaggerated in the drawings to better show the structural components involved. Thus, with a single support structure 10 and platform 12 shown in FIGURE 1, three cars may be parked in a space previously accommodating two cars. The parking capacity of the device may be further increased by extending the platform length to support two cars thereon rather than the one illustrated.

FIGURE 3 illustrates the manner in which two support structures may be used to support three platforms for elevating movement. Two of the support structures 10 may be transversely aligned and so spaced from each other as to form, in effect, a third support structure. Thus, as shown in FIGURE 3, the track like supporting means 44, 48 of a first support structure 10 are spaced from the track like support means 42, 46 of a second support structure a distance equal to the transverse spacing between the track like supports 42, 46 and 44, 48 of each support structure 10.

With an elevating platform positioned on each of the support structures 10 shown in FIGURE 3, it will be seen that a third platform may be supported between the two supporting structures. For this purpose, the width of each track like support means 42, 44, 46, 48, between the guide flanges 40, is sufficient to simultaneously support two platform wheels with sufficient clearance therebetween to accommodate the side braces extending through forward inclined planes 26, 28 without interference. The platform wheels 74 and 92 coact with guide flanges 40 to restrain excessive lateral movement of platform 12 during its traversal from the lower to the upper position shown in FIGURE 1. The phantom showing of the platforms 12, in FIGURE 3, illustrates the manner in which the two supporting structures may simultaneously accommodate three elevating platforms.

Accordingly, it will be seen that any number of support members 10 may be transversely aligned and spaced in the manner indicated with respect to two such members in FIGURE 3. It is, of course, obvious that any desired type of detachable cross bracing, such as the bracing 20, may be applied between adjacent aligned support structure. When positioned in the manner shown in FIGURE 3, track like support means 44 and 48 will not only provide support for the wheels on the right side of the platform (when positioned in the manner shown in FIGURE 1), but also for the wheels on the left side of a second platform whose right hand wheels will share a second support member 10 with the wheels of a third platform.

A slightly modified form of the invention to insure proper functioning of the same under adverse weather conditions, such as ice or snow, is illustrated in FIGURE 4. In accordance with this form of the invention, sprocket chains 96 are removably connected, by bolts or the like (not shown), to the upper surfaces of the flanges 40 on the rearward pair of track like supports 42, 44 for meshing engagement with sprockets 98 secured to axle shaft 72.

The construction shown in FIGURE 4 insures an operable driving connection between motor 82 and track like support means 42, 44 even though wheels 74 should tend to slip on friction surface 66 due to the presence of ice or snow.

Although particular embodiments of the invention have been described with reference to the elevation of an automobile, it is to be understood that the invention is equally applicable to the elevation of any load capable of being supported within the lateral confines of the load supporting portion of the platform.

I claim:

1. A load elevating device comprising, a generally horizontally disposed base support structure, forward and rearward track pairs including substantially parallel inclined plane portions secured to and extending upwardly from said support structure, said inclined plane portions being substantially coextensive in length, a load elevating platform including a load supporting portion and having forward and rearward axle mounted wheel pairs positioned transversely of said load supporting portion and supported on the upper surfaces of said track pairs to support said load supporting portion intermediate the tracks of each track pair, the fore and aft spacing of said wheel pairs approximating the fore and aft spacing of said inclined plane portions when measured in a horizontal plane, said inclined plane portions terminating at their upper and lower ends in substantially horizontal portions for supporting the elevating platform in elevated and lowered positions respectively, and power transmitting means connected to said platform for moving said elevating platform along said track pairs.

2. The device of claim 1 in which the width of said upper surfaces of said track pairs exceeds twice the width of each axle mounted wheel whereby said track pairs may provide an additional supporting surface for the wheels of elevating platforms positioned on either side of said load elevating device.

3. The device of claim 1 in which said power transmitting means includes a reversible motor and an irreversible gearing connection between said motor and one of said axle mounted wheel pairs.

4. Elevating means for a plurality of loads comprising, first and second load elevating devices, each of said load elevating devices including plural pairs of load supporting tracks having inclined portions in paired forward and rearward alignment and an elevating platform having axle mounted wheel pairs positioned transversely of said platform and supported on the upper surfaces of said load supporting tracks, the upper surface of each of said tracks exceeding twice the width of a wheel of each said wheel pairs, the individual tracks of each of said track pairs being transversely aligned, said first and second load elevating devices being transversely aligned and transversely spaced a distance equal to the transverse spacing between the individual tracks of each track pair of each load supporting device, a third elevating platform having axle mounted wheel pairs positioned transversely of said platform and supported on the upper surfaces of the adjacent load supporting tracks of said first and second load supporting devices, and power transmitting means connected to each of said platforms for moving said platforms along their respective supporting tracks.

References Cited by the Examiner
UNITED STATES PATENTS

| 56,947 | 8/1866 | Jenks | 187—12 |
| 774,348 | 11/1904 | Campbell | 187—12 |
| 2,472,943 | 6/1949 | Firestone | 187—12 |
| 2,581,887 | 1/1952 | Saxton | 187—12 |

FOREIGN PATENTS 1,320,651  1/1963  France.

EVON C. BLUNK, *Primary Examiner.*

H. C. HORNSBY, *Assistant Examiner.*